United States Patent [19]

Lyon

[11] Patent Number: 5,118,481
[45] Date of Patent: Jun. 2, 1992

[54] METHODS FOR REDUCING $NO_x$ EMISSIONS FROM COMBUSTION EFFLUENTS

[75] Inventor: Richard K. Lyon, Pittstown, N.J.

[73] Assignee: Energy and Environmental Research Corporation, Irvine, Calif.

[21] Appl. No.: 611,919

[22] Filed: Nov. 9, 1990

[51] Int. Cl.[5] .......................... C01B 21/00; B01J 8/00
[52] U.S. Cl. ...................................... 423/235; 423/239
[58] Field of Search ................... 423/239, 239 A, 235, 423/235 D

[56] References Cited

U.S. PATENT DOCUMENTS

| | | | |
|---|---|---|---|
| 3,118,727 | 1/1964 | Cohn | 423/239 |
| 3,900,554 | 8/1975 | Lyon | 423/235 |
| 4,208,386 | 6/1980 | Arand et al. | 423/235 |
| 4,325,924 | 4/1982 | Arand et al. | 423/235 |
| 4,335,084 | 6/1982 | Brogan | 423/235 |
| 4,350,669 | 9/1982 | Izumi et al. | 423/235 |
| 4,368,057 | 7/1983 | Matthews | 48/197 |
| 4,395,223 | 7/1983 | Okigami et al. | 431/10 |
| 4,743,436 | 5/1988 | Lyon | 423/235 |
| 4,849,192 | 7/1989 | Lyon | 423/235 |
| 4,851,201 | 7/1989 | Heap et al. | 423/235 |
| 4,861,567 | 8/1989 | Heap et al. | 423/235 |
| 4,863,704 | 9/1989 | Epperly et al. | 423/235 |

FOREIGN PATENT DOCUMENTS

| | | | |
|---|---|---|---|
| 54-28771 | 3/1979 | Japan | 423/239 |
| 54-38268 | 3/1979 | Japan | 423/235 |
| 54-119370 | 9/1979 | Japan | 423/235 |
| 1572118 | 4/1977 | United Kingdom | 53/34 |

OTHER PUBLICATIONS

Anna-Karin Hjalmarsson, $No_x$ Control Technologies for Coal Combustion pp. 54-58.

Primary Examiner—Gregory A. Heller
Attorney, Agent, or Firm—Workman, Nydegger and Jensen

[57] ABSTRACT

Methods for reducing $NO_x$ emissions from stationary combustion systems having variable flue gas temperatures and variable CO levels in the combustion effluents are disclosed. The present invention represents an improvement in the Thermal $DeNO_x$ process. Use of a condensed phase precursor of gaseous ammonia which causes a delay between initial mixing and reacting with the flue gas substantially reduces or eliminates the adverse effects of variable CO levels, and to a certain extent variable flue gas temperatures. Use of a condensed phase precursor of gaseous ammonia in combination with a second reducing agent dramatically increases the useful temperature range of the Thermal $DeNO_x$ process.

29 Claims, 4 Drawing Sheets

Reduction of NO by $H_2/NH_3$ mixtures $(NO)_o$ = 225 ppm, mass flow through reactor constant and corresponding to 0.1s at 1038 °C ⊠ for 0 = $H_2/NH_3$
⊠ for 0.125
□ for 0.50
× for 1.3
△ for 2.4

$(NH_3)_0 / (NO)_0$ = 2

METHODS FOR REDUCING $NO_x$ EMISSIONS FROM COMBUSTION EFFLUENTS

BACKGROUND

1. The Field of the Invention

The present invention is directed to an improved Thermal $DeNO_x$ process for control of $NO_x$ emissions. More particularly, the present invention is directed to methods for controlling $NO_x$ emissions from stationary combustion systems such as power plant boilers, process furnaces, and incinerators.

2. Technology Review

The problems of waste management in the United States urgently require the development of an environmentally acceptable incineration technology, but for one important class of pollutants, nitrogen oxides (commonly referred to as "$NO_x$"), the presently available $NO_x$ control technology provides only a very limited degree of control.

A survey by the United States Environmental Protection Agency indicates that the United States generates about 140 million metric tons of industrial waste and 230 million metric tons of municipal waste annually. In the past, most waste was disposed of by landfill, but such approaches are inherently unsatisfactory because the toxic materials in the waste are not destroyed or rendered innocuous but are merely isolated. Recognition of the dangers inherent in disposal by isolation has lead to increasingly tighter control and monitoring of these disposal practices, making them impractical and prohibitively expensive. It is not uncommon for landfills to be closed for reasons of environmental safety even when there are not alternative disposal methods available.

Incineration is potentially the ideal solution to the problem of waste management since toxic organic materials can be completely destroyed and most of the toxic inorganic materials of concern can be converted to an inert glass by operation at temperatures above the ash fusion point. Most of the problems which have given incinerators a poor reputation in the past have satisfactory answers. For instance, emissions of acid gases such as $SO_2$ and HCl can be controlled by wet scrubbers.

However, control of $NO_x$ emissions from incinerators is a problem to which no presently available technology provides a fully satisfactory answer. While the amount of $NO_x$ produced by burning waste can be minimized by managing the combustion process, waste typically contains substantial amounts of chemically bound nitrogen such that $NO_x$ levels are usually unacceptably high, even with careful control of the combustion process. As a result, some form of post combustion $NO_x$ control technology must be used in incineration processes.

Two types of post combustion $NO_x$ control technologies are presently available, selective catalytic reduction (SCR) and selective noncatalytic reduction (i.e., Thermal $DeNO_x$). Applications of SCR to incinerators are generally regarded as nonfeasible because waste contains virtually all possible trace impurities and these impurities can act as catalyst poisons.

Because no better technology currently exits, the Thermal $DeNO_x$ process has been accepted as the best available $NO_x$ control technology for incinerators. In the Thermal $DeNO_x$ process, $NH_3$ is contacted with flue gas at a temperature in the range from 900° C to 950° C. A homogeneous gas phase reaction occurs which reduces the NO in the flue gas to molecular nitrogen ($N_2$) and water ($H_2O$). The performance of Thermal $DeNO_x$ in actual incinerator applications has, however, been highly disappointing.

In most applications, the performance of the Thermal $DeNO_x$ process depends primarily on the available reaction time, i.e., the length of time the flue gas spends in the temperature range suitable for Thermal $DeNO_x$. For applications in which the available reaction time is less than 0.2 seconds, Thermal $DeNO_x$ typically achieves $NO_x$ reductions in the 60% to 80% range. For applications in which the available reaction time is greater than 0.2 seconds $NO_x$ reductions in the 80% to 90% range have commonly been achieved.

The design of a modern incinerator provides the post-flame gases with a residence time generally greater than 1.0 seconds in the temperature range appropriate to Thermal $DeNO_x$. Hence, one might expect incinerators to be a very favorable application for Thermal $DeNO_x$. Instead, however, $NO_x$ reduction in incinerators is actually 40% or less.

The poor performance of Thermal $DeNO_x$ on incinerators is, in part, a result of the fact that the temperature of the flue gas in incinerators is more highly variable than it is in other combustion systems. Waste is inherently a fuel with a highly variable BTU content. This variability causes the temperature of the flue gases downstream of the combustion zone to be nonhomogeneous in space and to fluctuate in time. If the temperature of the flue gas is a little too low at the point where the $NH_3$ is injected, slight or no NO reduction occurs. If the temperature is too high, the $NH_3$ has some tendency to oxidize to produce NO, and the net reduction of NO is poor or more NO may even be produced.

While there is a narrow range of temperatures in which nearly quantitative NO reductions are possible, at temperature below this range the reaction time between the NO and $NH_3$ is too slow to be useful while at temperature above this range the $NH_3$ oxidizes to form NO. Because this "temperature window" for the Thermal $DeNO_x$ process is narrow, successful application of the process is always critically dependent on locating the ammonia injection system at the location at which the average temperature is optimum for the process. In any application, however, the temperature will be nonhomogeneous, and process performance will be determined by an average over a temperature range. Since this always includes some temperatures which are too high and some which are too low for good $NO_x$ reduction, the practical extent of $NO_x$ control which the process can provide is always significantly less than is achieved in laboratory experiments.

Since the width of the Thermal $DeNO_x$ temperature window increases with increasing reaction time, the longer reaction time available in incinerators compensates, in part, for this difficulty. However, there is an additional problem: the optimum temperature for the Thermal $DeNO_x$ process may be shifted. For example, as shown in FIG. 1, (quoted from R. K. Lyon and J. E. Hardy, "Discovery and Development of the Thermal $DeNO_x$ Process," *Ind. Eng. Chem. Fundam.* Vol. 25, page 19, 1986; see also *Environmental Science and Technology*, Vol. 21, page 232, 1987) hydrogen ($H_2$) mixed with the ammonia shifts the Thermal $DeNO_x$ temperature window to lower temperatures. The magnitude of the temperature shift increases as the amount of $H_2$ is increased. This shifting of the temperature window is a general effect which occurs with other combustible materials, including CO, natural gas, etc.

This is a problem because waste material burned in an incinerator is far less homogeneous than any conventional fuel. Consequently, the mixing of fuel and air in an incinerator is much less intimate than with conventional fuel. Some regions in an incinerator's primary combustion zone are strongly fuel rich and produce a flue gas containing substantial amounts of CO and lesser amounts of other combustibles.

Modern incinerators are designed so that the gases leaving the primary combustion region have an extended residence time at high temperature. This permits flue gas coming from regions of fuel-rich combustion to mix with flue gas from fuel-lean regions, i.e., flue gas containing CO and no $O_2$ mixes with flue gas containing $O_2$ and virtually no CO. Because CO oxidation at these temperatures is a very rapid reaction, the overall rate of CO removal is almost entirely mixing limited.

In the Thermal DeNO$_x$ process, gaseous ammonia is mixed with a carrier gas such as steam or compressed air and injected via nozzles into the hot flue gas. These ammonia-containing jets cause intense local mixing. Since the portions of the flue gas which contain CO are not uniformly distributed, this intense local mixing creates some regions in which $O_2$ and CO are both present and some regions in which $O_2$ is present and CO is virtually absent. If the Thermal DeNO$_x$ process is applied to an incinerator, some of the flue gas being treated will contain significant amounts of CO and some will not.

The extent to which variable amounts of CO causes difficulties for the Thermal DeNO$_x$ process has been examined by computer modeling. In that study, it was assumed that the average CO concentration in the flue gas undergoing the Thermal DeNO$_x$ process was 500 ppm, and that this average could be roughly approximated by considering regions of flue gas in which the CO concentration was 0 ppm and 1000 ppm.

The results of these modeling calculations, shown graphically in FIG. 2, demonstrate that NO reductions in excess of 50% are possible over a substantial temperature range in the absence of CO and over a substantial temperature range in the presence of 1000 ppm CO. Unfortunately, these ranges have very little overlap. Thus, the presence of variable amounts of CO can substantially degrade the performance of the Thermal DeNO$_x$ process in much the same way as do variations in the flue gas temperature.

From the foregoing, it is apparent that what is currently needed in the art are methods for controlling NO$_x$ emissions from stationary combustion systems having variable flue gas temperatures. It would also be an advancement in the art to provide methods for controlling NO$_x$ emissions from stationary combustion systems having variable amounts of CO in the combustion effluents.

Such methods are disclosed and claimed herein.

BRIEF SUMMARY AND OBJECTS OF THE INVENTION

The present invention relates to methods for reducing NO$_x$ emissions from stationary combustion systems having variable flue gas temperatures and variable CO levels in the combustion effluents. The present invention represents an improvement in the Thermal DeNO$_x$ process. It has been found that by using ammonia in a form which causes a sufficient delay between initial mixing and reacting with the flue gas, the adverse effects of variable flue gas temperatures and variable CO levels can be substantially reduced or eliminated.

Current Thermal DeNO$_x$ processes use gaseous ammonia which is injected into the hot flue gases. Contacting of the ammonia with the flue gas occurs immediately upon mixing. When suitable ammonia precursors are used, rather than gaseous ammonia, there is a delay corresponding to the time required to convert the ammonia precursor into ammonia. Computer modeling results suggest that a delay between the initial mixing of the carrier gas (containing the ammonia precursor) with the hot flue gas and the actual contacting of ammonia with the flue gas significantly broadens the useful temperature range of the Thermal DeNO$_x$ process.

Within the instant invention, NH$_3$ is preferably injected into the flue gas not as a gas, but in a form which will produce gaseous NH$_3$ after some delay time. Thus, for example, the NH$_3$ may be in the form of an aqueous solution of ammonium carbonate. This solution may be injected as a spray of fine droplets. A spray of fine droplets may be produced by an air or steam blast atomizer. When the spray is injected into the flue gas, the fine droplets evaporate, the time needed for them to evaporate being governed by their size. Only when the evaporation of the water in the droplet nears completion does the ammonium carbonate start to decompose and release NH$_3$ into the vapor phase. By adjusting the droplet size, the delay between the contacting of the spray with the hot flue gas and the release of NH$_3$ can be adjusted.

A second reducing agent, e.g., H$_2$, CO, or natural gas, is preferably added to the air or steam used in the atomizer to produce the spray. In this way, the second reducing agent is in contact with the hot flue gas from the moment the spray mixes with it, but the NH$_3$ is in contact only after a delay, and the length of that delay can be suitably adjusted by adjusting the droplet size.

During the delay between initial contact with the flue gas and release of the NH$_3$, the second reducing agent can be oxidized. The amount of the second reducing agent that remains when the NH$_3$ is released will depend on the temperature of the flue gas. If the flue gas is relatively hot, the second reducing agent will oxidize rapidly, and very little of the second reducing agent will be left when the NH$_3$ is released. Conversely, if the flue gas is relatively cool, the oxidation of the second reducing agent will be slower, and most of the second reducing agent will remain at the time the NH$_3$ is released. Thus, by choosing the delay time suitably, the amount of second reducing agent remaining at the point when the NH$_3$ is released can be adjusted to match what is needed for optimum NO reduction.

It has also been found that using ammonia in a form that causes a sufficient delay between mixing and contacting substantially reduces or even eliminates the adverse effects of CO in the flue gas. Computer modeling results suggest that by causing an appropriately chosen delay time, the amount of CO present at the time of contacting will adjust itself based on the flue gas temperature to be approximately the amount of CO needed for optimum NO reduction at that temperature.

It is, therefore, an object of the present invention to provide methods for controlling NO$_x$ emissions from stationary combustion systems having variable flue gas temperatures. Another object of the present invention is to provide methods for controlling NO$_x$ emissions from stationary combustion systems having variable amounts of CO in the combustion effluents.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENT

The present invention relates to methods for reducing NO$_x$ emissions from stationary combustion systems having variable flue gas temperatures and variable CO levels in the combustion effluents. The present invention represents an improvement in the Thermal DeNO$_x$ process. The conventional Thermal DeNO$_x$ process controls NO$_x$ emissions from stationary combustion systems by injecting ammonia into the flue gases. The NH$_3$ causes a homogeneous gas phase reaction to occur which reduces NO to molecular nitrogen and water.

Thermal DeNO$_x$ provides excellent NO$_x$ control for flue gases only within a narrow temperature range. Unfortunately, the optimum temperature range for Thermal DeNO$_x$ is readily shifted by the presence of reducing agents such as natural gas, CO, and H$_2$. Because incinerator flue gases have wide variations in temperature and in carbon monoxide concentration, the Thermal DeNO$_x$ process is generally ineffective at providing suitable NO$_x$ control.

It has been found that by using ammonia in a form which causes a sufficient delay between initial mixing and reacting with the flue gas, the adverse effects of variable CO levels and to a certain extent, variable flue gas temperatures can be substantially reduced or eliminated. In addition, using ammonia in a form which causes a sufficient delay between initial mixing and reacting with the flue gas in combination with a second reducing agent dramatically increases the temperature range over which good NO reduction can be achieved with Thermal DeNO$_x$.

Current Thermal DeNO$_x$ processes use gaseous ammonia which is injected into the hot flue gases. Contacting of the ammonia with the flue gas occurs immediately upon mixing. When suitable ammonia precursors are used, rather than gaseous ammonia, there is a delay corresponding to the time required to convert the ammonia precursor into ammonia. Computer modeling results suggest that using ammonia in a form that causes a sufficient delay between mixing and contacting substantially reduces or even eliminates the adverse effects of CO in the flue gas.

Figure 1:
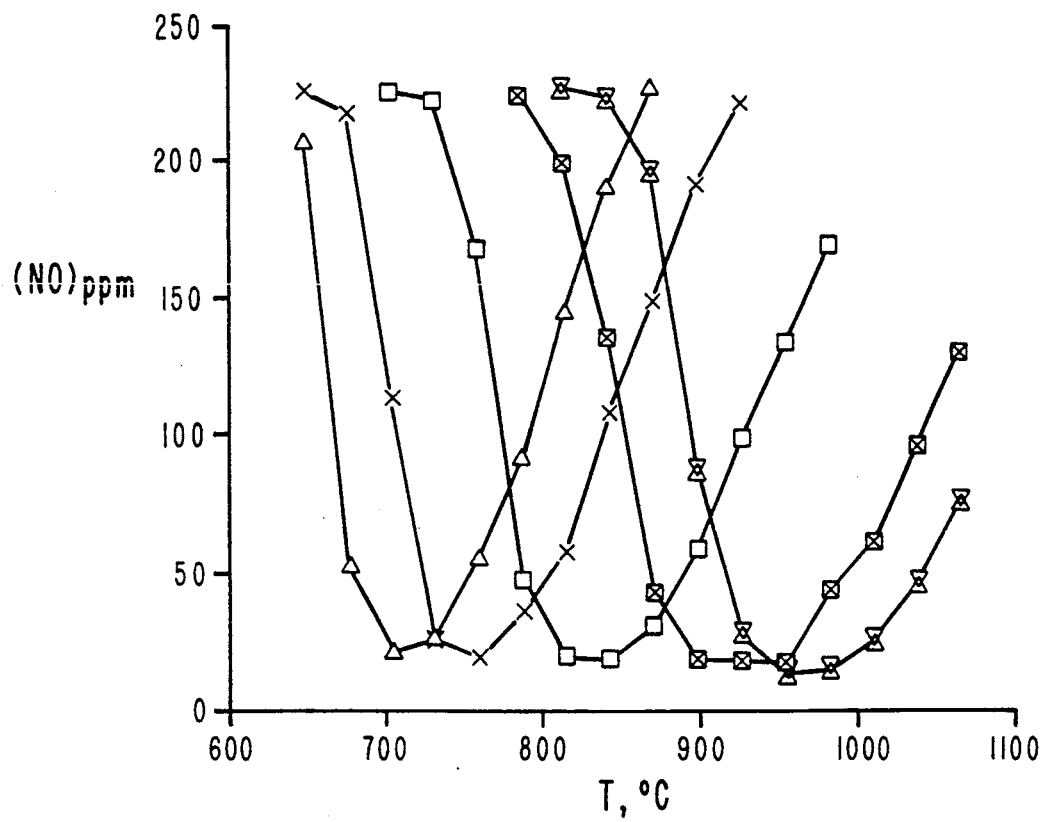
FIG. 1 is a graph illustrating how hydrogen mixed with ammonia shifts the temperature window of the Thermal DeNO$_x$ process to lower temperatures.
Figure 2:
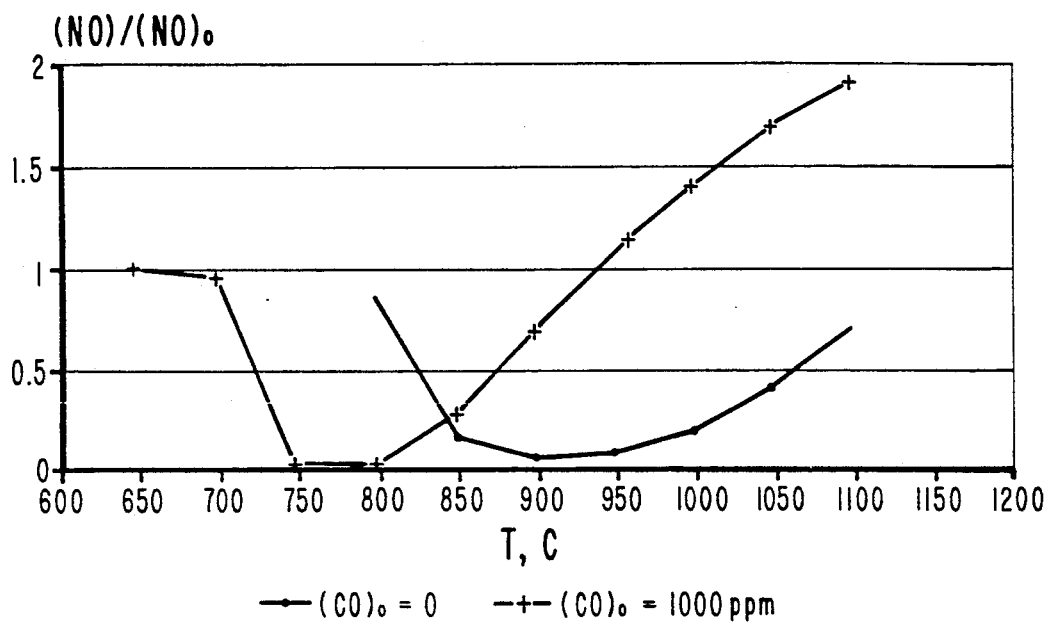
FIG. 2 is a graph illustrating the effect of CO on the temperature window of the Thermal DeNO$_x$ process.
Figure 3:
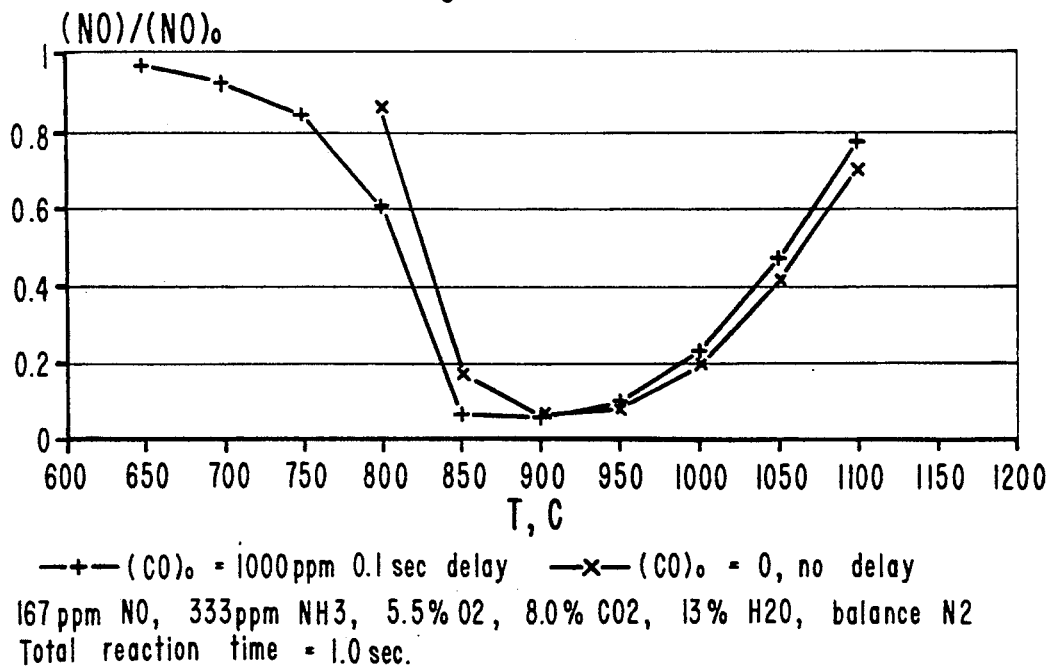
FIG. 3 is a graph illustrating the effect of CO and of a 0.1 second delay between mixing and contact with NH$_3$ on the temperature window of the Thermal DeNO$_x$ process.

FIG. 3 compares the results of computer modeling calculations for the Thermal DeNO$_x$ reaction with CO initially absent, no delay between mixing and contacting, and for a reaction time of 1.0 seconds with modeling calculations for a case in which 1000 ppm CO is present at the start of the reaction (mixing), the reaction time is 1.0 seconds, and there is 0.1 second delay between the start of the reaction and contacting with the ammonia. During this 0.1 second delay time, most of the initially present CO is oxidized (especially at the higher temperature end of the calculation). Consequently, there is little difference between the case in which CO is initially absent and the case in which CO is initially present and there is a 0.1 second delay.

Figure 4:
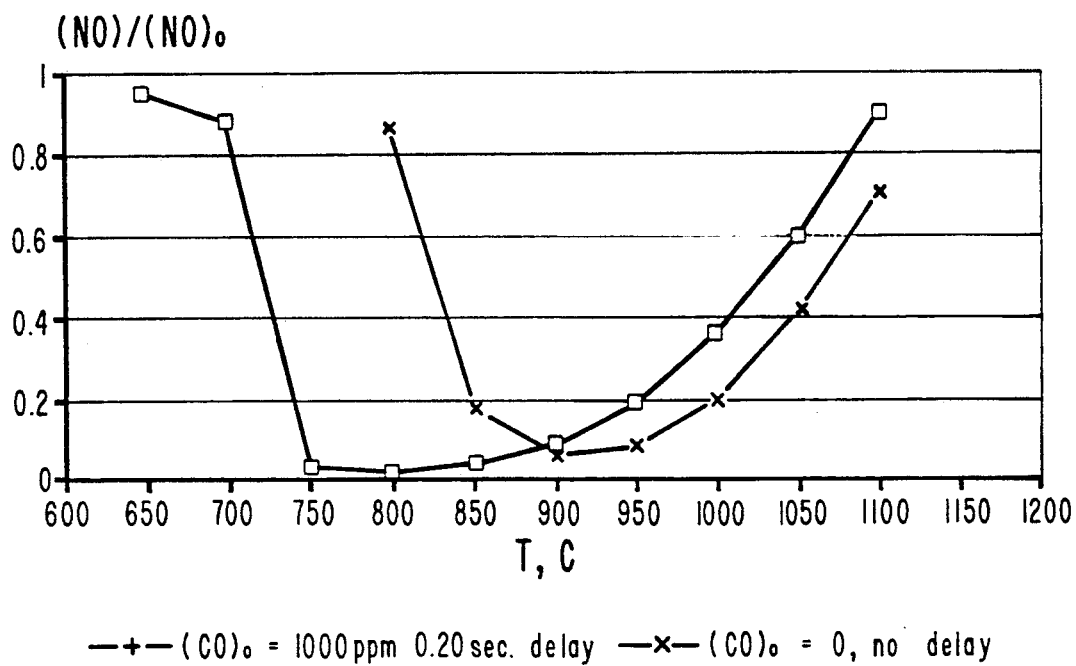
FIG. 4 is a graph illustrating the effect of CO and of a 0.02 second delay between mixing and contact with NH$_3$ on the temperature window of the Thermal DeNO$_x$ process.

FIG. 4 compares the results of computer modeling calculations for the Thermal DeNO$_x$ reaction under conditions identical to those of FIG. 3, except that a delay time of 0.02 seconds is assumed rather than 0.1 seconds. For a delay this short, the amount of CO which remains at the end of the delay period depends on the temperature. At high temperatures (i.e., temperatures so high that CO adversely affects the Thermal DeNO$_x$ reaction) very little CO remains at the end of the delay and the adverse effect on the Thermal DeNO$_x$ process is minimal. For lower temperatures, however, the presence of CO can improve NO reduction via Thermal DeNO$_x$.

The amount of CO needed to achieve an optimum NO reduction increases with decreasing temperature. The amount of CO left after the 0.02 second delay also increases with decreasing temperature. Of course, the activation energies for CO promotion of Thermal DeNO$_x$ and for CO oxidation are not identical but they are roughly comparable. Thus, the results shown in FIG. 4 suggest that it is possible to compensate, at least in part, for variations in flue gas temperature. By using an appropriately chosen delay time, the amount of CO present at the time of contacting will adjust itself based on the flue gas temperature to be approximately the amount of CO needed for optimum NO reduction at that temperature.

These computer modeling results suggest that a delay between the initial mixing of the carrier gas (containing the ammonia precursor) with the hot flue gas and the actual contacting of ammonia with the flue gas significantly broadens the useful temperature range of the Thermal DeNO$_x$ process. By suitably adjusting the delay time between mixing and contacting, it is possible to substantially increase the temperature range over which Thermal DeNO$_x$ is effective.

Within the instant invention, NH$_3$ is preferably injected into the flue gas not as a gas, but in a form which will produce gaseous NH$_3$ after some delay time such as a condensed phase precursor of gaseous ammonia. Typical condensed phase precursors of gaseous ammonia which may produce a desired time delay include salts of ammonia with an inorganic acid (preferably as a fine powder), solutions of the ammonia salts (injected into the flue gases as a mist), and a solution of ammonia itself (also injected into the flue gases as a mist). Suitable condensed phase precursors of gaseous ammonia are preferably not salts of ammonia with an organic acid, since such salts would be precursors of a second reducing agent.

Examples of ammonia salts suitable for use within the scope of the present invention include ammonium carbonate, ammonium bicarbonate, ammonium chloride, ammonium bromide, ammonium sulfate, ammonium bisulfate, ammonium phosphate, and mixtures thereof. Of these ammonium salts, ammonium carbonate and ammonium bicarbonate are currently most preferred since they produce ammonia, water, and carbon dioxide on decomposition, and hence, they do not form undesirable by-products. The other listed ammonium salts produce by-products which limit their use to combustion systems having suitable acid gas scrubbers or other means of removing the by-products from the flue gas.

The use of a condensed phase precursor of gaseous ammonia, rather than gaseous ammonia, causes a delay between the mixing of the ammonia precursor with the flue gas and the contacting of gaseous ammonia with the flue gas. Those skilled in the art will understand that the amount of delay may be adjusted by varying the particle size of the condensed phase ammonia precursor.

Thus, for example, if a solution of ammonium carbonate is used, the solution is preferably injected as a mist or spray of fine droplets. A spray of fine droplets may be produced by an air or steam blast atomizer. When the spray is injected into the flue gas, the fine droplets evaporate, the time needed for them to evaporate being governed by their size. Only when the evaporation of the water in the droplet nears completion does the ammonium carbonate start to decompose and release $NH_3$ into the vapor phase. By adjusting the droplet size, the delay between the contacting of the spray with the hot flue gas and the release of $NH_3$ can be adjusted.

Computer modeling results suggest that using ammonia in a form that causes a sufficient delay between mixing and contacting in combination with a second reducing agent significantly increases the temperature range over which good NO reduction can be achieved by Thermal $DeNO_x$.

A second reducing agent, such as $H_2$, CO, or natural gas (methane), is preferably injected into the flue gases together with the condensed phase precursor of gaseous ammonia. In this way, the second reducing agent is in contact with the hot flue gas from the moment the spray mixes with it, but the $NH_3$ is in contact with the flue gas only after a predetermined time delay.

During the delay between initial contact with the flue gas and release of the $NH_3$, the second reducing agent can be oxidized. The amount of the second reducing agent will depend on the temperature of the flue gas. If the flue gas is relatively hot, the second reducing agent will oxidize rapidly, and very little of the second reducing agent will be left when the $NH_3$ is released. Conversely, if the flue gas is relatively cool, the oxidation of the second reducing agent will be slower, and most of the second reducing agent will remain at the time the $NH_3$ is released. Thus, by choosing the delay time suitably, the amount of second reducing agent remaining at the point when the $NH_3$ is released can be adjusted to match what is needed for optimum NO reduction.

Figure 5:
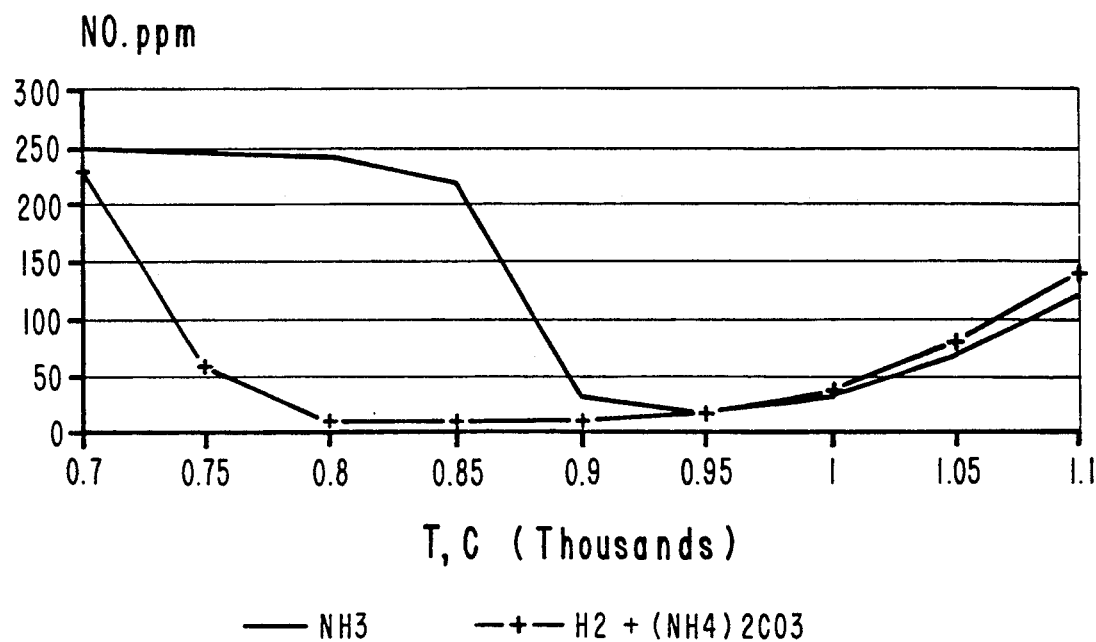
FIG. 5 is a graph comparing the effectiveness of the improved Thermal DeNO$_x$ process in which a mixture of ammonium carbonate (which causes a time delay) and H$_2$ are injected into the flue gas and the conventional Thermal DeNO$_x$ process in which just ammonia is injected into the flue gas.

FIG. 5 shows computer modeling calculations which illustrate the ability of the present invention to dramatically increase the useful temperature range of the Thermal $DeNO_x$ process. In these modeling calculations, it is assumed that the droplet evaporation time is 0.02 seconds and that the total reaction time is 0.2 seconds. The second reducing agent, assumed to be $H_2$ in this example, begins to oxidize at the start of the reaction time while the $NH_3$ becomes present only after 0.02 seconds. This allows a nearly quantitative NO reduction to occur over a wide temperature range.

FIG. 5 also shows, for comparison, modeling calculations of the reduction of NO by $NH_3$ alone. While $NH_3$ alone can cause good NO reduction, it does so only over a narrow temperature range and thus the instant invention represents an improvement over conventional Thermal $DeNO_x$.

The present invention can be successfully used to reduce $NO_x$ in flue gases having a temperature in the range from about 1300° F. to about 2000° F. at the point of contacting. The reaction time is preferably greater than 0.01 seconds and more preferably greater than 0.05 seconds. The reduction of $NO_x$ within the scope of the present invention preferably occurs in the presence of excess oxygen, with the oxygen concentration in the flue gases being in the range from about 0.5% to about 15%.

From the foregoing, it will be appreciated that the present invention provides methods for controlling $NO_x$ emissions from stationary combustion systems having variable flue gas temperatures and variable amounts of CO in the combustion effluents.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patents is:

1. A process for selectively reducing NO in combustion effluent streams having temperature variations, comprising the step of simultaneously contacting a first nongaseous reducing agent and a second reducing agent into a combustion effluent stream containing NO and excess oxygen, at a point where the temperature of the combustion effluent stream is in the range from about 1300° F. to about 2000° F., said first reducing agent being a precursor of gaseous ammonia and being a salt of an inorganic acid and said second reducing agent being gaseous, and consumed by oxidation upon introduction into the combustion effluent stream, said first and second reducing agents being present in an amount sufficient to noncatalytically and selectively reduce the NO content, wherein a time delay greater than about 0.01 seconds occurs between introduction of the first reducing agent into the combustion effluent stream and its conversion into gaseous ammonia such that the gaseous ammonia noncatalytically and selectively reduces the NO after the time delay.

2. A process for selectively reducing NO in combustion effluent streams having temperature variations as defined in claim 1, wherein the oxygen concentration in the combustion effluent stream is in the range from about 0.5% to about 15%.

3. A process for selectively reducing NO in combustion effluent streams having temperature variations as defined in claim 1, wherein the reaction time is greater than about 0.05 seconds.

4. A process for selectively reducing NO in combustion effluent streams having temperature variations as defined in claim 1, wherein the first reducing agent includes an ammonia salt with an inorganic acid.

5. A process for selectively reducing NO in combustion effluent streams having temperature variations as defined in claim 4, wherein the first reducing agent includes a solution of the ammonia salt with an inorganic acid.

6. A process for selectively reducing NO in combustion effluent streams having temperature variations as defined in claim 1, wherein the first reducing agent includes a solution of ammonia.

7. A process for selectively reducing NO in combustion effluent streams having temperature variations as defined in claim 4, wherein the ammonia salt is ammonium carbonate.

8. A process for selectively reducing NO in combustion effluent streams having temperature variations as defined in claim 4, wherein the ammonia salt is ammonium bicarbonate.

9. A process for selectively reducing NO in combustion effluent streams having temperature variations as defined in claim 4, wherein the ammonia salt is ammonium chloride.

10. A process for selectively reducing NO in combustion effluent streams having temperature variations as defined in claim 4, wherein the ammonia salt is ammonium bromide.

11. A process for selectively reducing NO in combustion effluent streams having temperature variations as defined in claim 4, wherein the ammonia salt is ammonium sulfate.

12. A process for selectively reducing NO in combustion effluent streams having temperature variations as defined in claim 4, wherein the ammonia salt is ammonium bisulfate.

13. A process for selectively reducing NO in combustion effluent streams having temperature variations as defined in claim 4, wherein the ammonia salt is ammonium phosphate.

14. A process for selectively reducing NO in combustion effluent streams having temperature variations as defined in claim 1, wherein the second reducing agent includes hydrogen.

15. A process for selectively reducing NO in combustion effluent streams having temperature variations as defined in claim 1, wherein the second reducing agent includes methane.

16. A process for selectively reducing NO in combustion effluent streams having temperature variations as defined in claim 1, wherein the second reducing agent includes carbon monoxide.

17. A process for selectively reducing NO in effluent streams from the combustion of waste having significant and variable amounts of CO, comprising the step of contacting a first nongaseous reducing agent into a combustion effluent stream containing NO, variable amounts of CO, and excess oxygen at a point where the temperature of the combustion effluent stream is in the range from about 1300° F. to about 2000° F., said first nongaseous reducing agent being a precursor of gaseous ammonia, and being a salt of an inorganic acid, said first reducing agent being present in an amount sufficient to noncatalytically and selectively reduce the NO content, wherein a time delay greater than about 0.01 seconds occurs between introduction of the first reducing agent into the combustion effluent stream and its conversion into gaseous ammonia such that the gaseous ammonia noncatalytically and selectively reduces the NO after the time delay.

18. A process for selectively reducing NO in combustion effluent streams having significant and variable amounts of CO as defined in claim 17, wherein the oxygen concentration in the combustion effluent stream is in the range from about 0.5% to about 15%.

19. A process for selectively reducing NO in combustion effluent streams having significant and variable amounts of CO as defined in claim 17, wherein the reaction time is greater than about 0.05 seconds.

20. A process for selectively reducing NO in combustion effluent streams having significant and variable amounts of CO as defined in claim 17, wherein the first reducing agent includes an ammonia salt with an inorganic acid.

21. A process for selectively reducing NO in combustion effluent streams having significant and variable amounts of CO as defined in claim 17, wherein the first reducing agent includes a solution of the ammonia salt with an inorganic acid.

22. A process for selectively reducing NO in combustion effluent streams having significant and variable amounts of CO as defined in claim 17, wherein the first reducing agent includes a solution of ammonia.

23. A process for selectively reducing NO in combustion effluent streams having significant and variable amounts of CO as defined in claim 21, wherein the ammonia salt is ammonium carbonate.

24. A process for selectively reducing NO in combustion effluent streams having significant and variable amounts of CO as defined in claim 21, wherein the ammonia salt is ammonium bicarbonate.

25. A process for selectively reducing NO in combustion effluent streams having significant and variable amounts of CO as defined in claim 21, wherein the ammonia salt is ammonium chloride.

26. A process for selectively reducing NO in combustion effluent streams having significant and variable amounts of CO as defined in claim 21, wherein the ammonia salt is ammonium bromide.

27. A process for selectively reducing NO in combustion effluent streams having significant and variable amounts of CO as defined in claim 21, wherein the ammonia salt is ammonium sulfate.

28. A process for selectively reducing NO in combustion effluent streams having significant and variable amounts of CO as defined in claim 21, wherein the ammonia salt is ammonium bisulfate.

29. A process for selectively reducing NO in combustion effluent streams having significant and variable amounts of CO as defined in claim 21, wherein the ammonia salt is ammonium phosphate.

* * * * *

UNITED STATES PATENT AND TRADEMARK OFFICE
CERTIFICATE OF CORRECTION

PATENT NO. : 5,118,481
DATED : June 2, 1992
INVENTOR(S) : RICHARD K. LYON

It is certified that error appears in the above-identified patent and that said Letters Patent is hereby corrected as shown below:

```
Column 2, line 35, "temperature" should be --temperatures--
Column 2, line 37, "temperature" should be --temperatures--
Column 3, line 11, "temperature" should be --temperatures--
```

Signed and Sealed this

Twelfth Day of October, 1993

Attest:

BRUCE LEHMAN

Attesting Officer

Commissioner of Patents and Trademarks